Figure 1:
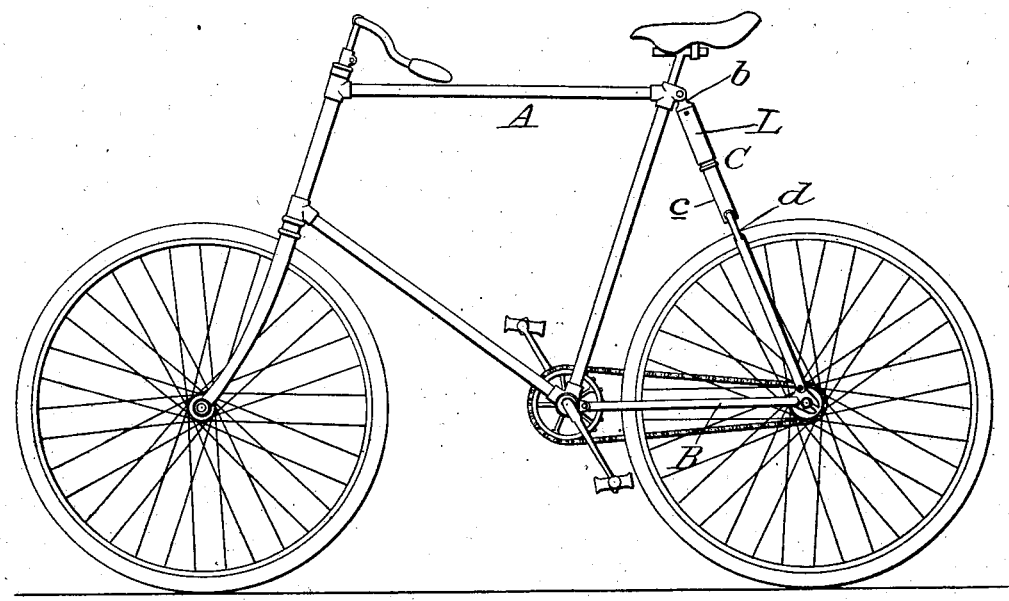

No. 721,343. PATENTED FEB. 24, 1903.
C. L. TRAVIS, DEC'D.
A. E. TRAVIS, ADMINISTRATRIX.
BICYCLE OR LIKE VEHICLE.
APPLICATION FILED DEC. 8, 1902.

NO MODEL. 2 SHEETS—SHEET 1.

No. 721,343. PATENTED FEB. 24, 1903.
C. L. TRAVIS, DEC'D.
A. B. TRAVIS, ADMINISTRATRIX.
BICYCLE OR LIKE VEHICLE.
APPLICATION FILED DEC. 8, 1902.
NO MODEL. 2 SHEETS—SHEET 2.
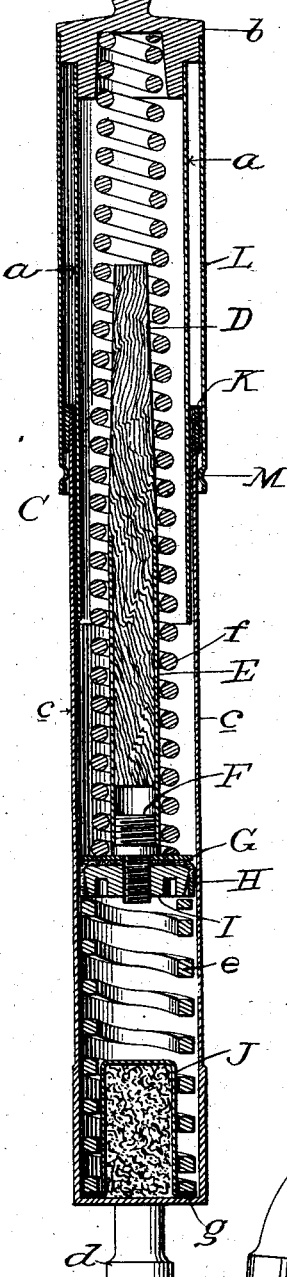
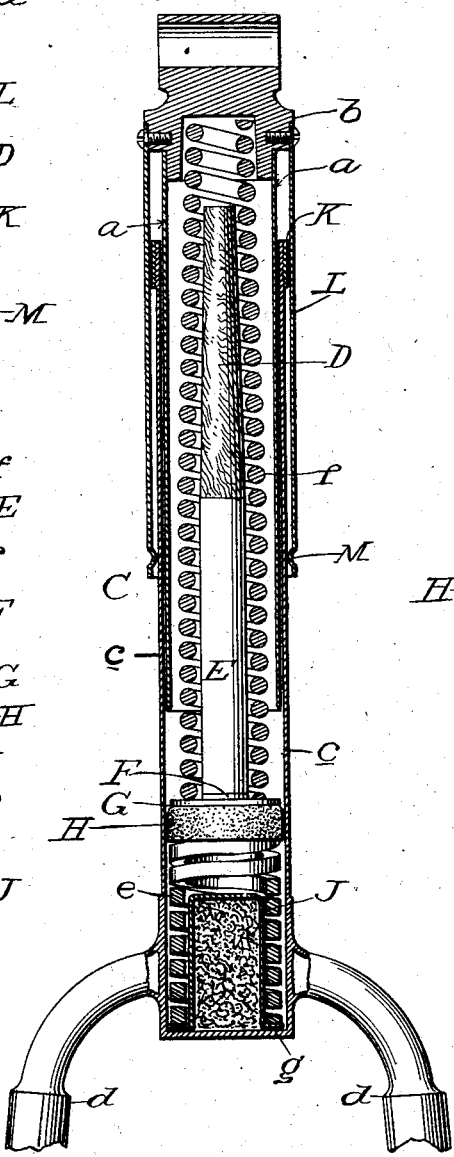
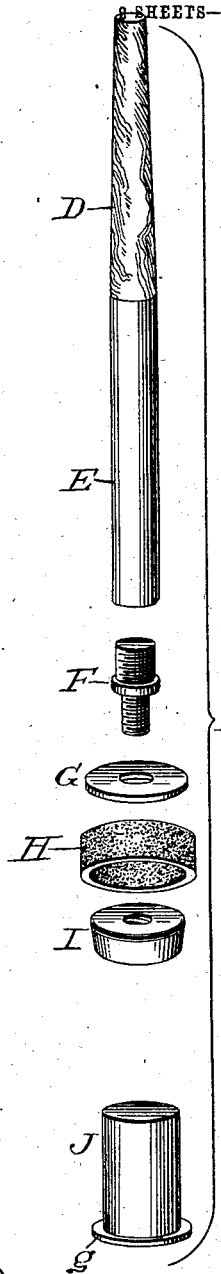
Witnesses
Inventor

UNITED STATES PATENT OFFICE.

ANGIE E. TRAVIS, OF SPRINGFIELD, MASSACHUSETTS, ADMINISTRATRIX OF CHARLES L. TRAVIS, DECEASED.

BICYCLE OR LIKE VEHICLE.

SPECIFICATION forming part of Letters Patent No. 721,343, dated February 24, 1903.

Application filed December 8, 1902. Serial No. 134,368. (No model.)

*To all whom it may concern:*

Be it known that CHARLES L. TRAVIS, deceased, late a resident of Springfield, in the county of Hampden and State of Massachusetts, did invent certain new and useful Improvements in Bicycles or Like Vehicles, of which the following is a specification.

This invention pertains to bicycles and like vehicles; and it consists in novel features which will be hereinafter fully set forth, reference being had to the annexed drawings, in which—

Figure 1 is a side elevation of a bicycle having the improvement applied thereto; Fig. 2, a longitudinal sectional view of the telescopic brace; Fig. 3, a similar view, the line of section being at right angles to that of Fig. 2; and Fig. 4, a perspective view showing various parts of the device detached.

The purpose of the present invention is to produce a yielding brace for bicycles and like vehicles and one which shall be applicable to various parts thereof. The device is more especially intended for and is peculiarly serviceable in or as a part of the rear brace interposed between a rigid front frame and a rear-wheel fork pivotally or flexibly connected with the front frame, where it serves to take up the shock and vibration incident to travel over rough or uneven surfaces and to prevent transmission thereof to the rider. The space available for such a brace in bicycles of desirable or approved pattern and proportions is limited, yet unless the spring be of considerable length and quite elastic it will be of little benefit. For this reason the brace in the present construction is made with a telescopic spring case or shell composed of two tubular members sliding one within the other with their inner ends open and their outer ends closed, thus securing for the spring or springs a space equal in length to that of the two members less the extent of their overlapping or telescoping. Experience has demonstrated that with actual working measurements and conditions a length of spring can thus be secured sufficient to insure an easy and elastic support for the rider. Such support is found adequate for very smooth roads and for travel over slightly-rough surfaces; but if the machine be ridden over very rough and uneven surfaces the spring, if highly elastic, is liable to yield under the sudden and severe strain and pressure and permit the bottoming of the telescoping members or the contact of the spring-coils, thus occasioning a shock to the rider. To prevent this, the telescoping members have heretofore been made to fit air-tight one within the other, and thus to confine a body of air, which being compressed by the telescoping of the members supplemented the spring and gave a constantly-increasing support for the rider directly proportioned to the severity of the shock and the consequent range of movement. It has been ascertained, however, that where a continuous air-chamber is provided of a length equal or approximately equal to that of the spring the compression of the air is comparatively slight under any practicable range of movement of the telescoping sections, and hence it is desirable to reduce the length of the air-chamber while maintaining the length of the spring and range of movement. This may be accomplished in different ways, but is best done by dividing the spring into two sections and interposing between them a close-fitting piston, by which the air-space is separated into two chambers. The chambers are represented as of unequal length; but the actual air-space is approximately the same in both, though in both these respects the proportions may be varied as found expedient.

Referring now to the drawings, the preferred embodiment of the invention will be more specifically described.

A, Fig. 1, indicates a front frame, comprising a steering-fork head, a pillar-post, and two connecting bars or members, as in the diamond frame now generally adopted.

B indicates a rear-wheel fork hinged or otherwise flexibly connected to the front frame A at or near the pedal-shaft barrel, and C a brace extending from the rear portion of fork B to the upper rear portion of frame A, to both of which it is jointed or otherwise flexibly conected in such manner as to permit a rising-and-falling motion of the rear fork and wheel independently of the front frame or of the front wheel and frame independently of the rear wheel and fork. The preferred construction of brace C is illustrated in Figs. 2, 3, and 4, upon referring to which it will be seen to comprise an upper tube $a$, having a head or cap $b$; a lower tube $c$, carried by or forming an upward prolongation or extension of a brace-fork $d$, which fork straddles the rear wheel and is jointed or otherwise flexibly connected with the rear-wheel fork; two springs $e$ and $f$, placed end to end within the telescoping tubes $a$ and $c$, and a diaphragm or piston interposed between the two springs and dividing the interior space of the telescopic air-chamber C into two distinct spaces. Tube $a$ is of a diameter to fit and slide freely yet closely within tube $c$ and advisably so closely that by the application of oil, vaseline, or other good lubricant to their opposing faces an air-tight joint may be produced and maintained. The upper spring $f$ is represented as formed of round wire and the lower spring $e$ as of rectangular wire—a construction which, though not obligatory, is advantageous in practice. Spring $f$ is shown tapering and has its upper end seated in a socket in head or cap $b$, whereby it is kept concentric with the telescopic shell C. Spring $e$ is of a diameter enough smaller than the interior of tube $c$ to permit its folds to be pressed close together without causing it to bind within the tube; but no unnecessary space is left, the intention being that when thus collapsed or compressed the spring shall practically or very nearly reach the walls of the tube. Being of wire rectangular in cross-section, it will be seen that spring $e$ when collapsed or closely compressed makes practically a cylindrical tube, though it is not intended that absolute contact of its folds shall take place in use. The separation or space between the coils of spring $e$ is greater than that between the coils of spring $f$, the intention and practice being to make the aggregate space between the coils of one spring equal to that of the spaces between the coils of the other. So, too, it is the intention and practice to so proportion the wire of the two springs that there shall be a proportionate extent of compression of the two under given load and that the coils of one shall reach their nearest approximation simultaneously with those of the other. This relation is attained by careful test in the first instance, after which the springs are produced of uniform size, proportions, quality, and temper by the now common and unfailing methods. Slight variations in the proportions are within the scope of the present invention. The space within the upper chamber of the telescopic member is greater than that in the lower chamber, which latter is reduced in a manner presently to be explained. To bring them more nearly to the same air-containing capacity and also to prevent lateral deflection of spring $f$, a wooden stem D is provided, tapering to correspond to the taper of the spring $f$, which stem is placed centrally within the spring and sustained by means of a tubular stem E, which is screwed or otherwise made fast to the threaded upper end of a plug F, the lower portion of which is reduced in diameter and also threaded, as seen in Figs. 2 and 4. G indicates a metallic disk or washer encircling the smaller and bearing beneath the larger portion of plug F, and H indicates a cup-leather placed beneath and clamped against disk G by a nut I. The skirt of the cup-leather is turned downward, so that in rising it will not be spread outward by air-pressure, but on descending it will be expanded by the air beneath it, which is compressed by the descent of the piston or diaphragm, the rise of tube $c$, or both. Stems D E reduce the air-space above the diaphragm or piston, so that it is somewhat less than would be that below if the lower part of tube $c$ were unoccupied except by spring $e$. It is, however, desirable that while the springs $e$ and $f$ shall be long and elastic the lower air-chamber shall be short, and hence a thimble or cartridge J (preferably drawn up out of sheet metal) is introduced into tube $c$ before spring $e$ is placed therein. This thimble or cartridge has a closed upper end, its open lower end being encircled by a flange $g$, and it may be filled with cork or other light substance to exclude air. Its diameter is such as to just fill without binding against the interior walls of spring $e$, and it rests upon the bottom of shell or tube $c$, where it is centered and held by spring $e$, resting upon its flange, as shown in Figs. 2 and 3. Of course the thimble may be made of any other suitable material or materials. By referring to Figs. 2 and 3 it will be seen that by the introduction of the thimble J an annular space is formed just large enough to receive and to permit free play of spring $e$. Within this space a small quantity of soft oil (as sweet-oil, castor-oil, or the like) is introduced, so that when spring $e$ is compressed the oil shall be caused to rise to or slightly above the top of thimble J, thus compelling all the air below the piston or diaphragm to occupy the short space between said diaphragm and the top of the thimble or surface of the oil. With the proportions represented in the drawings, which have been found quite satisfactory in practical tests, the range of movement or of telescoping action of the tubes $a$ and $c$ is approximately three inches, and the distance between the top of thimble J and the piston or diaphragm is approximately one and a half inches when the parts are free from load. Suppose now that the telescopic section C be caused to shorten one inch and a half and that the distance between diaphragm or piston G H I and thimble J be reduced to three-quarters of an inch, the oil in the base of tube $c$ being thereby raised to the top of the thimble. It will result that the air below the piston or diaphragm will be compressed into about one-half its bulk, or to thirty pounds. A further shortening of the telescopic section C three-quarters of an inch and of the lower air-space three-eighths of an inch will again reduce the bulk of the air and double its compression, making it sixty pounds to the inch. A further shortening of the section C three-eighths of an inch will reduce the air-space below the piston or diaphragm to three-sixteenths of an inch and double its compression, making it one hundred and twenty pounds to the inch, and so on, building up or multiplying the resistance in an increasing ratio directly proportionate to the range of movement, which in turn must always be proportionate to the jar or shock to be absorbed or taken up. While this action is taking place in the lower chamber, the upper air-chamber is being reduced by the shortening of section C, the approach of the folds of spring $f$, and the filling of the upper part of said spring by the stem D E, so that the rate of compression of the air in the upper chamber is more rapid than it would be if due only to the shortening of section C. The relation between springs $e$ and $f$, the dimensions of the upper and lower air-chambers, and the proportions generally may be varied as desired, so as to produce any required differential in the rate of compression of the springs or of the air, or both. Either the upper or the lower spring may be removed and replaced by another of different dimensions, shape, or stiffness, a larger or a smaller stem D may be put in place, a greater or less quantity of oil or other liquid may be employed in the lower air-chamber and likewise in the upper one, and in these several ways any desired relation, and consequently any proper relative action, of the parts may be readily obtained.

To exclude dust from the working parts and to preclude the soiling of the rider's clothing, a dust guard or shell L is advisably employed. This may be attached to a swell or enlargement of cap $b$ and is ordinarily provided with an indentation or contraction M at or near its lower end, which engaging beneath a collar K at the top of tube $c$ precludes accidental separation of the parts.

When the telescopic section C is extended to its full length, the air is at normal atmospheric pressure, and the shells fitting air-tight the quantity of air remains constant, though its bulk varies as the section C shortens and lengthens.

The working of the device is extremely easy, uniform, and satisfactory, the springs carrying the weight of the rider and affording a very elastic support, relieving both rider and machine of all jar, vibration, and concussion, and the air-cushion adapting itself promptly, certainly, and precisely to the duty of supplementing the springs when an encounter with obstructions, ruts, or depressions renders such contribution necessary. It is particularly to be noted that the rider's weight is carried normally by the springs, which afford the easiest possible support and permit an ample range of movement, and that the air-cushion exerts no material influence or effect except when the jolt or jar is so great as would involve undue collapse of the springs if acting alone. The play of the springs, stem, piston, &c., is found to cause a constant distribution or circulation of the lubricant and consequent sealing of the air-chamber.

It is possible, though not deemed desirable ordinarily, to omit the lower spring entirely, employing only an air-cushion or confined-air body below the piston or diaphragm; but this involves an accuracy of fit and a perfection of seal that is difficult to maintain in practice. Such construction, however, is within the scope of the present invention, being the equivalent so far as it goes, but not the full equivalent thereof.

It will be observed that under this construction the upper and longer spring, which ordinarily responds more readily to and absorbs any jolt or jar given the wheels in passing over rough places, is itself spring-supported, and, further, that the support combines both the metallic spring $e$ and the short pneumatic cushion or spring produced by the air confined and compressed in the space or chamber below piston G H I. The spring $f$ consequently acts in the same manner, to all intents and purposes, as did the spring of the device shown and described in Letters Patent of the United States granted and issued to Charles L. Travis July 21, 1896, and numbered 564,319, while the yielding support for said spring and the rapidly-increasing, though constantly-elastic, support afforded by the short air-cushion and the lower spring preclude any abrupt stoppage of movement or any bottoming of the telescopic cushioning device as a whole.

Obviously certain features of the device may be used without others. Thus, for instance, the cartridge or thimble J may be omitted, the stem D E may be employed or not, as deemed desirable, and the shells or telescoping tubular members $a$ and $c$ may be made to fit air-tight or otherwise, as preferred. In any event the spring $f$ will itself be yieldingly supported and will give in the event of any sudden or severe jolt, so that there can be no abrupt stoppage or bottoming of the parts of the cushion. The primary object of the invention is to insure this yielding effect under all circumstances, while retaining the easy action and quick response of the spring $f$ to lessen shocks, and while the construction shown in its entirety is preferred, as indicated, less than the whole may be used.

The construction of the piston is that which is deemed best in practice; but it is not intended to restrict the application to any specific form of piston or diaphragm. Provided only that a construction be adopted which shall confine the air beneath it and give adequate support for the spring $f$, the details of construction may be varied as desired, and spring $e$ may be used or omitted, as above indicated. Its use is desirable for the reason, among others, that if there should be leakage of air upward past the piston the piston might not return properly to its elevated position without the aid of the spring. Similarly the thimble and oil may be used in or omitted from the air-chamber, as found expedient in any given case.

As above indicated, the construction of the piston or diaphragm may be varied, provided only it properly confine the air between it and the opposite end of the air chamber or cushion. In other words, it has to be a close-fitting piston, either by reason of its completely filling the space when in action and subject to pressure or because of its fitting so closely that the application of suitable lubricant shall cause it to make a close or air-tight joint when moved toward the opposite end of the air chamber or cushion or subject to pressure acting in that direction. The cup-leather construction is found to serve the purpose most satisfactorily, but is illustrated simply as a type of close-fitting piston or diaphragm. It is therefore to be understood that the term "close-fitting" as used in this specification and in the claims means any piston which when moved in a direction to reduce or contract the air chamber or cushion shall make a close or air-tight joint with the tube or shell in which it moves.

Having thus described the invention, what is claimed is—

1. In a brace or support for bicycles and like vehicles, the combination of tubular shells arranged to telescope one within the other; springs inclosed in said tubes and arranged to be compressed or to expand simultaneously; and a close-fitting piston interposed between the springs and supporting one of said springs.

2. In a brace or support for bicycles and like vehicles, the combination of a pair of continuous tubular shells adapted to telescope one within the other and to form a closed air-space; and a close-fitting piston or diaphragm disconnected from said shells and serving to divide the air-space into two compartments.

3. In a brace or support for bicycles and like vehicles, the combination of a pair of continuous tubular shells adapted to telescope one within the other; springs mounted within and extending from the closed ends of the tubes toward each other; and a close-fitting piston mounted between the proximate ends of the two springs.

4. In a brace or support for bicycles and like vehicles, the combination of a pair of continuous tubular shells adapted to telescope one within the other; springs mounted within and extending from the closed ends of the tubes toward each other, the lower one of said springs being relatively short; and a close-fitting piston mounted between the ends of the springs.

5. In a brace or support for bicycles and like vehicles, the combination of a pair of tubular shells adapted to telescope one within the other; springs mounted within and extending from the closed ends of the tubes toward each other; and a close-fitting piston mounted between the ends of the springs, said piston comprising a tubular neck or stem E, provided with a threaded plug F extending from its lower end, a washer G, packing H, and base I.

6. In a brace for bicycles and like vehicles, the combination of two continuous telescoping tubular shells; a close-fitting piston or diaphragm dividing the interior space of said shells into two chambers; two springs, one on either side of said piston or diaphragm; and a stem projecting from the piston or diaphragm into one of the chambers to reduce the air-space therein.

7. In a brace for bicycles and like vehicles, the combination of a continuous inner tubular shell and a continuous outer tubular shell arranged to telescope one within the other; a piston or diaphragm dividing the interior of said shells into two air-chambers; two springs located within the shells, one on either side of the piston or diaphragm; and a thimble or cartridge extending from the end of one of the shells into the spring therein, to reduce the air-space and form an annular pocket for the spring.

8. In a brace for bicycles and like vehicles, the combination of two telescoping tubular shells, each continuous from end to end; a piston or diaphragm dividing the interior space of said shells into two air-chambers; springs on opposite sides of said piston or diaphragm serving to retain the latter in position; and stems or bodies adapted to enter within the respective springs and to reduce the air-space within the two air-chambers, substantially as set forth.

9. In a brace or support for bicycles and like vehicles, the combination of a pair of tubular shells arranged to telescope one within the other; a spring within said shells tending to force them apart or elongate the telescoping device; and a confined-air cushion or support for said spring.

10. In a brace or support for bicycles and like vehicles, the combination of a pair of tubular shells adapted to telescope one within the other; a spring serving to elongate the telescopic structure formed by said shells; and an air-cushion beneath and forming a support for said spring.

11. In a brace or support for bicycles and like vehicles, the combination of an upper tubular shell or member; a lower tubular shell or member telescoping with the first; a spring within the telescopic structure formed by said shells; a support within the lower shell or member for said spring; and an air-cushion below said support; whereby the spring is adapted to yield and permit the shortening of the telescopic structure under relatively light jolts or concussion, and the air-cushion is adapted to support said spring and to yield to greater jars or concussion.

12. In a brace or support for bicycles and like vehicles, the combination of a pair of tubular shells adapted to telescope one within the other; a spring within said shells tending to press them apart longitudinally; and a confined-air chamber below said spring, affording a support for the base upon which the spring rests, said chamber being relatively short as compared with the spring-chamber, whereby the resistance of the air in said chamber is rapidly multiplied upon the descent of the spring-support.

13. In a brace or support for bicycles and like vehicles, the combination of two tubular shells adapted to telescope one within the other; a spring within said shells tending to force the same apart or outward relatively to each other; a base or support within said shells for the spring to rest upon; a confined-air cushion or chamber beneath said support, serving to yieldingly sustain the same; and a second spring acting upon and tending normally to elevate said spring-support, and to supplement the resistance offered by the air confined within said air-chamber.

14. In a brace or support for bicycles and like vehicles, the combination of a pair of tubular shells adapted to telescope one within the other; a spring contained within said shells and tending to force the same apart; a movable base or support for said spring fitting air-tight within one of said shells; and a second spring serving to sustain said spring-support, and to permit it to yield under heavy strain or pressure.

15. In a brace or support for bicycles and like vehicles, the combination of a pair of tubular shells adapted to telescope one within the other; a spring within said shells tending to force them longitudinally apart; a base or support within said shells for said spring; an air-chamber beneath said support, adapted to contain and confine a body of air; and a second spring acting upon and tending to elevate the support for the first spring, substantially as set forth.

16. In a brace or support for bicycles and like vehicles, the combination of two tubular shells adapted to telescope one within the other; a spring within said shells tending to move the same longitudinally apart; a support for said spring fitting air-tight within one of the shells; and a second spring tending to elevate the support for the first spring, said springs being separate and distinct from each other, whereby either spring may be changed at will for one of less or greater stiffness or strength and thus any desired relation be established.

17. In a brace or support for bicycles and like vehicles, a telescopic member provided with an elongating-spring; and an air-cushion beneath and serving as a support for the spring.

In testimony whereof I have signed my name to this specification in the presence of two subscribing witnesses.

ANGIE E. TRAVIS,
*Administratrix of the estate of Charles L. Travis, deceased.*

Witnesses:
C. W. HERRICK,
FRANK J. DEMOND.